INVENTORS.
HERBERT FRIEDMAN
TALBOT A. CHUBB
BY
ATTORNEY

INVENTORS.
HERBERT FRIEDMAN
TALBOT A. CHUBB
ATTORNEY

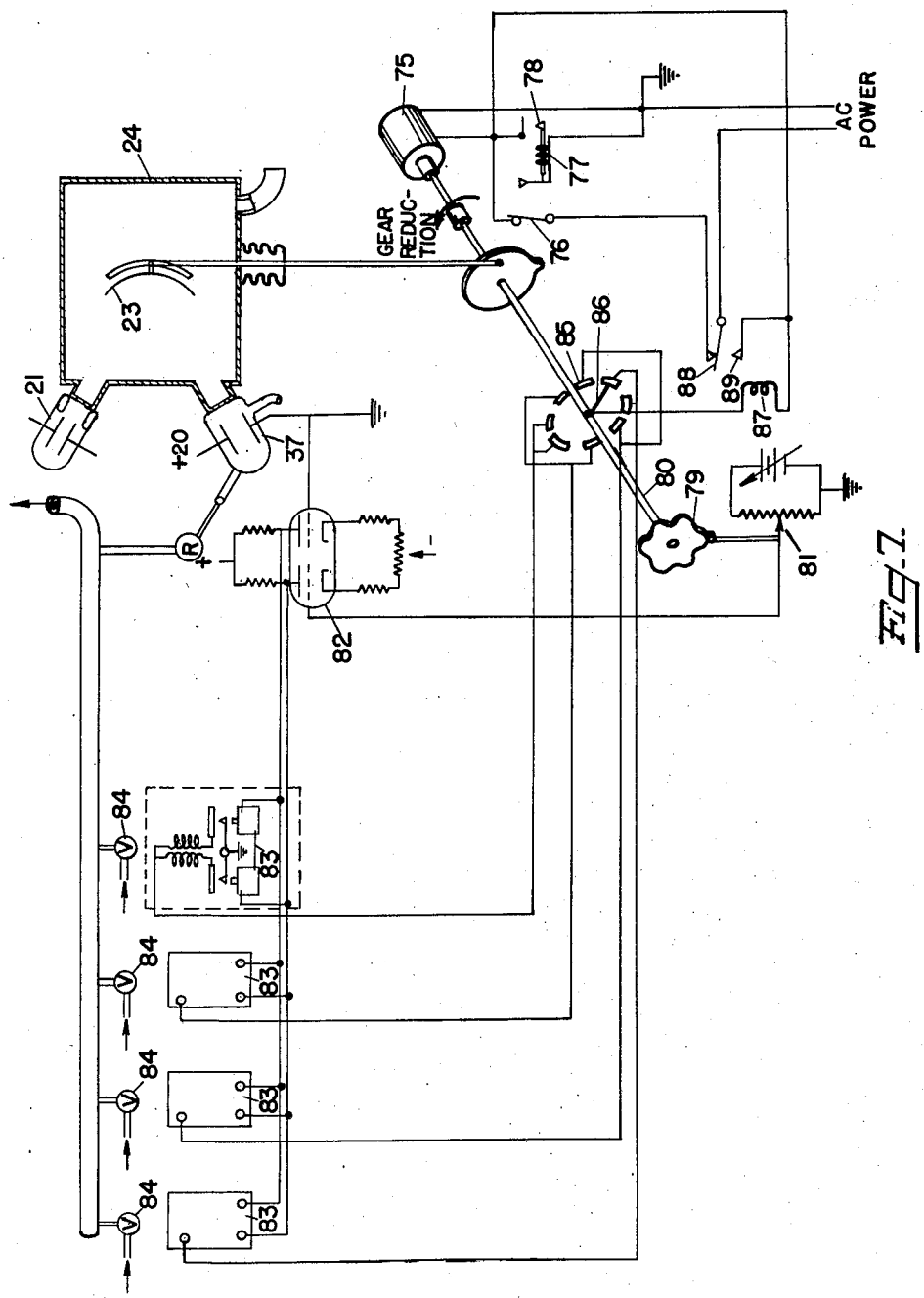

United States Patent Office 2,901,625
Patented Aug. 25, 1959

2,901,625

ULTRA-VIOLET GAS ANALYSIS

Herbert Friedman, Arlington, Va., and Talbot A. Chubb, Forest Heights, Md.

Application January 5, 1956, Serial No. 557,474

14 Claims. (Cl. 250—43.5)

This invention relates to ultra-violet gas and vapor detection, analysis and control and novel methods and means for utilization of the ultra-violet photoionization of individual gases and vapors for detection, measurement and control thereof.

This invention uses the relationship between the known ionization potentials of the various gases and vapors and the wavelength of ultra-violet energy which will ionize that gas for detecting the presence of the gas in a medium which is not ionized at that wavelength. This principle of detection permits the identification of various components of a mixture and the measurement and control of the concentrations thereof by measurement of the wave-length at which ionization occurs and the magnitude of the ionization current. The invention is particularly well suited to the detection of hydrocarbon gas and vapor mixtures but is not limited thereto.

The objects of the present invention are to provide new and improved methods and means of gas and vapor detection, measurement and control.

These and other objects will become apparent from the following detailed description taken in conjunction with the accompanying drawings in which:

Fig. 7 is another arrangement for gas control.

Figure 1:
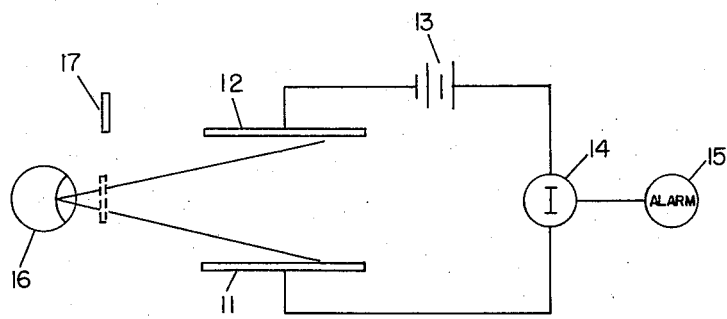
Fig. 1 is a simple form of detector for photoionizable vapors.

Referring to Fig. 1 an arrangement suitable for detecting gas contaminants in air includes a pair of electrodes 11, 12 between which a potential difference is maintained by a D.C. source 13. In circuit with the electrodes 11, 12 and source 13 is an electrometer current meter 14 capable of detecting the ionization current flowing between the electrodes 11, 12. The current indicator 14 preferably includes an alarm 15 which is actuated by detection of a predetermined ionization current level. The space between the plates is irradiated with ultra-violet light from a suitable source 16 which will be selected to emit energy of wavelength between 1100 and 1700A using a filter 17 which can be introduced into the light path. Identification of particular gas components can be accomplished by the ionization potential peculiar to each gas. Other forms of control of the wavelength of the radiation can be used such as characteristic line sources and the monochromatizer, for example.

In operation the gas detector is energized and the ionization chamber formed by the plates 11, 12 is irradiated. Since the air is not ionized by energy of wavelength greater than 1100A no current flows. If a minute trace of ionizable gas appears in the chamber, it is ionized and an ionization current flows through the indicator 14 and actuates the alarm 15 if of sufficient magnitude as determined by the concentration of the ionized gas.

Figure 2:
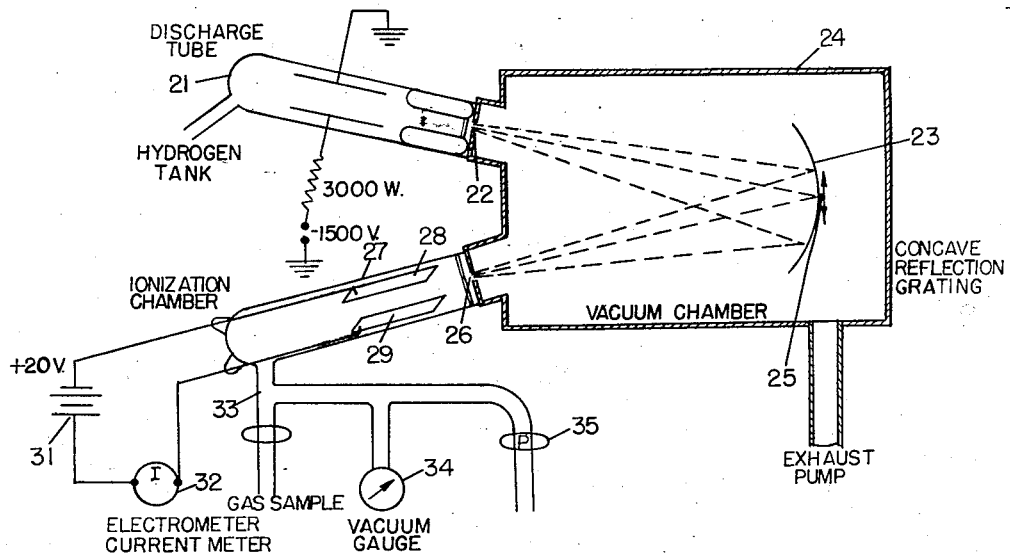
Fig. 2 is an apparatus for analyzing a gas sample for various component gases.

Referring now to Fig. 2 a hydrogen discharge tube 21 is arranged to direct ultra-violet light through a slit 22 upon a diffraction grating 23. The grating 23 is inclosed in a housing 24 and is mounted from either pivotal motion about its axis 25 or for displacement along the circumference of a circle determined by the axis 25, slit 22 and an exit slit 26. This housing 24 is similar to vacuum ultra-violet apparatus and will be partially evacuated by a suitable exhaust pump. Ultra-violet light from the source 21 is monochromatized by the grating 23 to provide any desired wavelength at the exit slit 26 within, for example, the operating range of 1000–1700A. The monochromatic energy passing through exit slit 26 enters an ionization chamber 27 which comprises electrodes 28, 29 maintained by a potential difference by the D.C. source 31 and connected to an electrometer current meter 32. The interior of the chamber 27 is in communication with a supply (not shown) of the gas to be analyzed through a tube 33. Also connected to the tube 33 are a vacuum gauge 34 and a vacuum pump 35 for maintaining a predetermined operating pressure in the ionization chamber 27.

In the operation of the apparatus of Fig. 2 the discharge tube 21 is energized to provide a continuous ultraviolet spectrum. The housing 24 is partially evacuated and the ionization chamber 27 is filled with the gas mixture to be analyzed. The pressure of the gas mixture within the chamber 27 is reduced to a predetermined level which is maintained. Operating potentials are applied to the electrodes 28, 29 and ionization current as a function of wavelength is measured on the meter 32 as the grating 23 is moved through its operating range.

Figure 3:
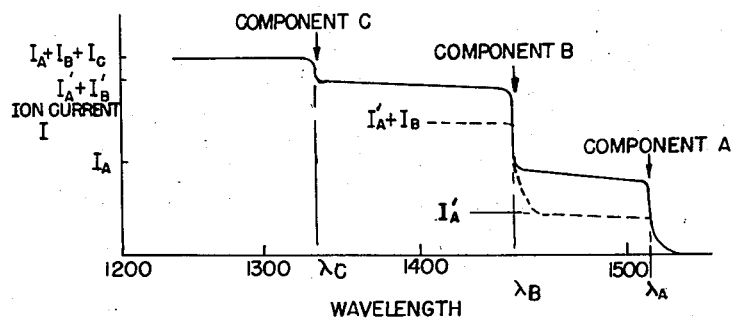
Fig. 3 is a diagram representing the responses obtained in accordance with the present invention.

The data obtained with the foregoing operation is presented in Fig. 3 for a gas mixture of three ionizable components A, B, C. At the long wavelength position of the grating 23 no gas is ionized and the current measured by the meter 32 is zero. The photionization threshold of each gas component is unique and occurs at a wavelength which identifies the gas according to the relation $$\lambda = \frac{12345}{ev}$$

where $\lambda$ is the wavelength in Angstrom units and $ev$ is the ionization potential of the gas in electron volts. An illustrative table of ionization potentials for a few gases which are readily detectable by this invention is as follows:

| Aromatics: | Ev |
|---|---|
| Benzene | 9.24 |
| Toluene | 8.92–8.77 |
| Ethylbenzene | 8.75 |
| Isopropylbenzene | 8.60 |
| Monochlorobenzene | 8.8 |
| Tertbutylbenzene | 8.5 |
| Xylene | 8.3 |
| Beta-methylnaphthalene | 8.0 |
| Alcohols, ethers, aldehydes, ketones, esters: | |
| Formic acid | 11.29 |
| Formaldehyde | 10.88 |
| Acetaldehyde | 10.23 |
| Methylalcohol | 10.8 |
| Ethylalcohol | 10.7 |
| Dimethylether | 10.5 |
| Diethylether | 10.2 |
| Acrolein | 10.22 |
| Acetone | 10.1 |

As shown in Fig. 3 at wavelength $\lambda_A$ the ionization current will be $I_A$ and the magnitude of the current $I_A$ will vary with the concentration of gas component A. As the wavelength decreases to $\lambda_B$, component B is ionized and detected current is the sum of $I_A$ and $I_B$. Similarly for wavelength less than $\lambda_C$ the ionization current will be the total of $I_A + I_B + I_C$.

Since the ionization current varies with concentration of a gas, a decrease in concentration of component A would produce a decreased current $I'_A$. This decreased current $I'_A$ will be also observed when component B is detected with a total current $I'_A + I_B$ since each gas is ionized by all wavelengths shorter than its photoionization threshold. For this reeason, knowledge of the response below the photoionization threshold of a gas component is required to determine the concentration of the component. In like manner the fine structure of the ionization response curve for a gas can be taken into account in making quantitive measurements since the shape of the response curve including fine structure for a given gas is invariant and only the relative magnitude of ionization current varies with concentration.

Figure 4:
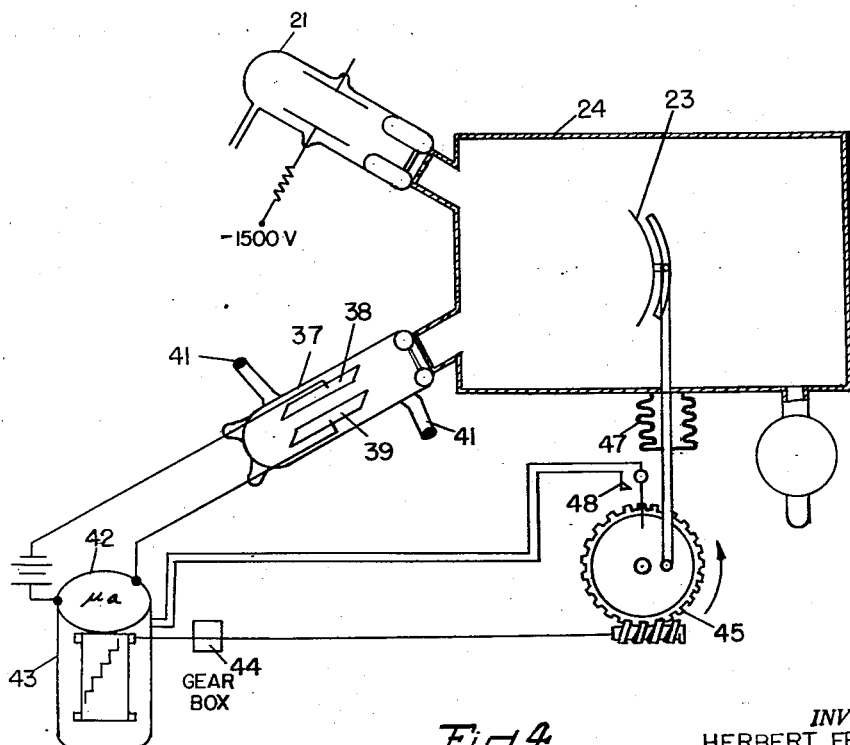
Fig. 4 is an apparatus similar to that of Fig. 3 arranged for repetitive analysis and data recording.

An instrument of the type described for Fig. 2 is shown in Fig. 4 arranged for automatically recording the response of a gas. The general arrangement includes the hydrogen discharge ultra-violet source 21 and the vacuum housing 24 containing the monochromator 23. A detector tube 37 has spaced electrodes 38, 39 and spaced ports 41 which may be connected to train gas through the tube 37 in continuous flow at predetermined pressure. The electrodes 38 39, are connected to a microammeter 42 which operates a motor driven recorder 43. The record drive is connected through suitable gearing 44 to an eccentric drive 45 which provides reciprocating motion to the drive shaft 46. The shaft 46 is coupled through a flexible seal 47 to the monochromator 23 within the housing 24. In this manner the device of Fig. 4 operates repetitively to record the ionization current of a gas mixture flowing between the ports 41 as the monochromator 23 is moved back and forth through a range of wavelength settings in synchronism with the drive of the record 43. For ascertaining synchronization, a marker contact 48 can be provided to be closed at a predetermined position of the eccentric 45 to produce an index mark on the record.

Figure 5:
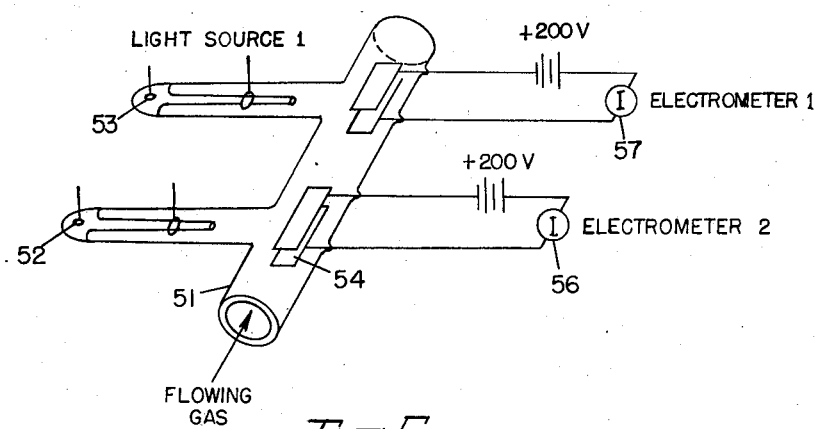
Fig. 5 is a modification of the invention for continuous analysis of a flowing gas.

Fig. 5 shows a modification for continuously monitoring two or more gas components in a steady flow stream. A portion of the gas stream at predetermined pressure enters a tube 51 and flows to its destination. The tube 51 has spaced therealong has spaced therealong ultra-violet light sources 52, 53 which are of different wavelength according to the gas components to be detected. Opposite the sources 52, 53 are individual ionization detectors 54, 55 connected to respective current meters 56, 57. Any number of ultra-violet sources, detectors and meters can be positioned along the tube 51 for the detection of as many gas components as desired. As an example of the operation of the device of Fig. 5 light source 52 may be a low pressure xenon discharge furnishing mainly light of 1465A wavelength while the light source 53 may be a low pressure krypton discharge furnishing mainly 1235A wavelength light. This arrangement is suitable for measuring, for example, the relative amount of xylene in toluene since the xenon light is capable of ionizing xylene but not toluene. If desired the current meters 56, 57 could be clock controlled recording microammeters to provide a time record of the flowing gas.

In any of the forms of the present invention where an ultra-violet source of predetermined wavelength is desired any suitable source may be used such as undispersed gas discharge lamps, gas discharge lamps in combination with gaseous or solid light filters and gas discharge lamps in combination with a vacuum ultra-violet monochromator made up with one exit slip, as in Fig. 2, or with multiple exit slits arranged to receive adjacent wavelength refracted energy.

Figure 6:
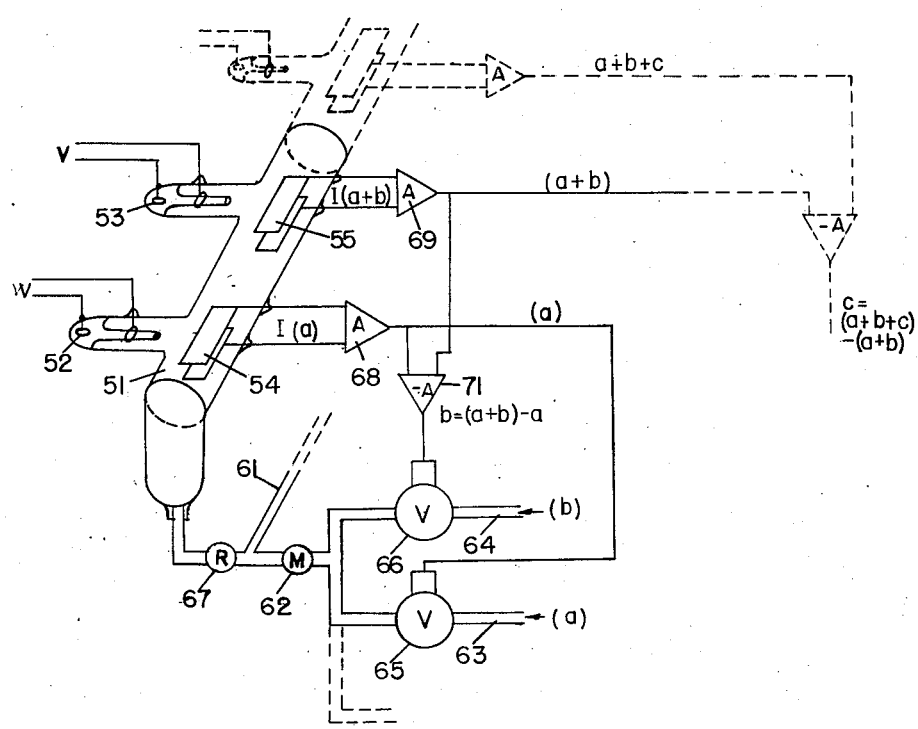
Fig. 6 is a form of the invention arranged for continuous control.

In Fig. 6 a continuous multi-component detection system is arranged to regulate the composition of the gas. A main gas line 61 is supplied through a mixing valve 62 from the component gas lines 63, 64 which are connected to sources of gas $Ga$ and gas $Gb$, respectively. The quantities of the gases $Ga$ and $Gb$ supplied is determined by electrical proportional control valves 65, 66, respectively. For effecting control, a portion of the mixture in the main line 61 is bled off through a reducing valve 67 to an analyzer flow tube 51. The tube 51 has axially spaced ultra-violet sources 52, 53 and ionization detectors 54, 55 similar to the apparatus of Fig. 5. The source 52 ionizes gas component $Ga$ and the detector 54 detects a current $Ia$ representative of the quantity of gas $Ga$ in the tube 51. The current $Ia$ is supplied to the input of an amplifier 68 which produces a proportional control output $(a)$. In similar manner the source 53 and detector 55 provide the current $I(a+b)$ which is supplied to an amplifier 69 which provides a proportional control output $(a+b)$ representative of the quantity of gas components $Ga$ and $Gb$ in the tube 51.

To control the flow of gas $Gb$ the control quantities $(a)$ and $(a+b)$ are combined in a subtracting circuit 71 to obtain the control quantity $b$ which regulates the valve 66 with respect to a predetermined setting for the desired value of $(b)$. To control the flow of the gas $Ga$ the control quantities $(a)$ is applied to the valve 65 to regulate its setting with respect to a setting of the desired valve of $(a)$. The extension of this arrangement to the control of additional gas components is straightforward and is indicated in Fig. 6. All that is required for deriving additional control signals is the detection of the total ionization current for all components ionized at a particular wavelength and subtracting the signal derived from components ionized at longer wavelengths.

Another form of automatic regulation apparatus is shown in Fig. 7 employing the vacuum ultra-violet monochromator 24 which is driven by a motor 75. At the long wavelength setting of the grating 23 the eccentric 45 cams a contact 76 open to deenergize the motor 75 and start thermal time delay element 77. At the end of a predetermined time a time delay contact 78 closes energizing the motor 75 and closing the contact 76 to permit the motor to run through another scanning cycle. Preferably the scanning cycle will be short compared to the inactive period. During the running of the motor 75 a cam 79 generates a signal on a movable contact 81 which corresponds to the desired ionization signal as detected by the detector tube 37. These two signals are compared in a differential amplifier 82 the output of which controls a differential relay 83. The relay 83 differentially controls a valve 84 to increase or decrease the flow of a particular gas component. Each gas component is controlled by a similar valve 84 actuated in response to a similar differential relay 83 connected to the amplifier 82. The return circuit for the actuation of the valve 84 flows through a segmented commutator 85 which has a contact 86 movable with the cam 79 to connect the appropriate relay 83 for the instant gas component being analyzed. The return current selected by the contact 86 flows through a relay 87 which when energized opens a contact 88 and closes a stick contact 89. The relay 87 is energized from the motor 75 side of the contact 76.

In the operation of the apparatus of Fig. 7 a scanning cycle is initiated by the time delay contact 78 closing to energize the motor 75. The motor 75 runs through one revolution of the cam 79 and is shut off by the opening of the contact 76. In the event that the cam generated signal at slider 81 and the detected signal from tube 37 differ, the relays 83 are energized in the proper sense to correct the difference signal. Only that relay 83 which is returned to the A.C. power through the commutator contact 86 is energized to actuate the associated valve 84 and this return current flow actuates relay 87 to stop the motor 75. Relay 87 remains energized until the differential signal is reduced to deenergize the differential relays 83. The motor 75 then runs through the cycle as before and stopping to permit correction of each differential signal. During the inactive period the relay 87 is not connected to power due to the open contact 76 and no response of valves 84 to differential signals occurs until the scanning cycle.

The cam 79, contact 86 and eccentric 45 are all adjustably secured to an insulated shaft 80.

Many modifications of the present teachings will now be apparent and are to be understood as being within the scope of the invention as defined in the appended claims.

We claim:

1. A gas detector for detecting a gas component having a predetermined ultra-violet photoelectric ionization threshold comprising an ion chamber having a pair of spaced electrodes, means for positioning said electrodes in a medium in which the presence of said component is to be detected, means for producing a potential difference between said electrodes of magnitude below the level for producing a self-sustained electric discharge in said chamber, means for irradiating with ultra-violet light the space in said chamber and means for detecting the ionization current produced by said ultra-violet light between said electrodes.

2. A photoionization detector for a gas component having a predetermined photoionization threshold for ultra-violet radiation comprising a pair of spaced electrodes means for immersing said electrodes in a gaseous medium containing said gas component, means for producing a potential difference between said electrodes of magnitude below the level for producing a self-sustained electric discharge, means for irradiating the medium in the neighborhood of said electrodes with ultra-violet radiation of wavelength equal to or less than the photoionization threshold for said gas component, and means for detecting the ionization current produced by said ultra-violet radiation between said electrodes.

3. Apparatus for the analysis of photoionizable gas mixtures comprising a vacuum ultra-violet monochromator having entrance and exit openings and an adjustable diffraction grating, a polychromatic source of ultra-violet radiation directed on said grating through one of said openings, an ion chamber detector positioned to receive monochromatic radiation from the other of said openings, means for detecting the ionization current in said ion chamber, means for introducing said gaseous mixture into said ion chamber under controllable pressure, and means for moving said grating to vary the wavelength of radiation entering said ion chamber whereby the photoionization threshold of the components of said mixture are detected.

4. Apparatus for the analysis of photoionizable gas mixtures comprising a vacuum ultra-violet monochromator instrument having entrance and exit openings and an adjustable diffraction monochromator, a polychromatic source of ultra-violet radiation directed on said monochromator through one of said openings, an ion chamber detector positioned to receive monochromatic radiation from the other of said openings, means for detecting the ionization current in said ion chamber, means for introducing said gas mixture into said ion chamber under controllable pressure, means for repetitively moving said monochromator to vary the wavelength of radiation entering said ion chamber over a predetermined band, and means for recording the detected ionization current synchronously with the variation of said wavelength.

5. Apparatus according to claim 4 in which said gas mixture is passed through said ion chamber in continuous flow.

6. A detector for photoionizable gas mixtures where the components of said mixtures have different photoionization thresholds comprising a source of ultra-violet radiation of wavelength less than said thresholds for only one of said components, an ionization detector containing said mixture and irradiated by said source, a second source of ultra-violet radiation of wavelength less than said threshold for two of said components, an ionization detector containing said mixture and irradiated by said second source and individual current indicators for said ion chamber detectors.

7. Apparatus according to claim 6 in which said ultra-violet sources are spaced along a conduit for said gas mixture, said ion chambers are positioned in said conduit opposite their respective ultra-violet sources and said gas mixture flows along said conduit and through said chambers.

8. Apparatus for controlling the proportions of a mixture of photoionizable gases comprising a conduit for said mixture, means for supplying the gases of said mixture to said conduit in individually controllable quantities, a first source of ultra-violet of wavelength less than the photoionization threshold of one of said gases positioned to irradiate a limited portion of said conduit, a first ion chamber detector within said conduit positioned to be irradiated only by said first source, a second source of ultra-violet of wavelength less than the photoionization threshold of two of said gases positioned to irradiate a different limited portion of said conduit, a second ion chamber detector within said conduit positioned to be irradiated only by said second source, electric control means responsive to the ionization current of said first detector for controlling the quantity of said one gas, and electric control means responsive to the difference between the ionization current in said first and second detectors for controlling the quantity of the other of said gases.

9. Apparatus for controlling the quantities of photoionizable components of a gas mixture comprising a plurality of sources of ultra-violet radiation one of each of said components to be controlled and the wavelengths of said radiation from said sources corresponding to the respective photoionization potentials of said components, an ionization detector for each of said sources, means for supporting said detectors in said gas mixture with each detector irradiated only by its respective source, electrically responsive quantity control means for each of said components, means responsive to the ionization detector for the longest wavelength source for controlling said control means which controls said component of lowest photoionization potential, and means responsive to the difference in ionization detected by each pair of said detectors irradiated by successive adjacent wavelengths for controlling said control means which controls said components of successively higher photoionization potential.

10. Means for regulating a gas flow mixture containing photoionizable components comprising an ion chamber detector, means for training said mixture into said ion chamber, means for irradiating said ion chamber with ultra-violet energy means for varying in a cycle the wavelength of said energy over a band including the photoionization thresholds of said components, means for generating a standard signal synchronously with the variation of said wavelength corresponding to a predetermined ionization current response in said ion chamber, means for producing a differential signal in response to comparing said standard signal and the ionization current detected in said ion chamber during each cycle, means responsive to said differential signal for controlling the flow of said components and means cyclically conditioning said last named means for controlling only one of said components in correspondence with each respective photoionization threshold in said cycle.

11. Apparatus according to claim 10 and including means responsive to the initiation of correction of flow of any of said components for interrupting said cycle until the flow of said component has been corrected.

12. Apparatus according to claim 10 and including means for alternating said cycles of varying said wavelength with inactive periods, and means for interrupting changes in flow control during said inactive periods.

13. The method of analyzing photoionizable gas mixtures comprising the steps of generating ultra-violet light of predetermined wave length, introducing said gas mixture into an ion chamber, irradiating said gas in said ion chamber with said ultra-violet light, and detecting the ionization response in said ion chamber to said predetermined wave length.

14. A gas detector for detecting gas contaminants in air, said contaminants having predetermined photoionization thresholds for ultra-violet radiation comprising a pair of spaced electrodes, means for positioning said electrodes to have said air containing said contaminants between said electrodes, means for producing a potential difference between said electrodes of magnitude below the level for producing a self-sustained electric discharge, means for irradiating said air and said contaminants in the neighborhood of said electrodes with ultra-violet radiation of wavelength equal to or less than the photoionization threshold for said contaminants, and means for detecting the ionization current produced by said ultra-violet radiation between said electrodes.

References Cited in the file of this patent

UNITED STATES PATENTS

| 2,458,099 | Roop | Jan. 4, 1949 |
| 2,761,975 | Weisz | Sept. 4, 1956 |

OTHER REFERENCES

Chubb et al.: "Photon Counters for the Far Ultraviolet," The Review of Scientific Instruments, vol. XXVI, No. 5, May 1955, pages 493–498.

Locher: "Photoelectric Quantum Counters for Visible and Ultraviolet Light, Part I," Physical Review, vol. XLII, November 15, 1932, pages 525–546.